(No Model.)
F. L. ATEN.
CORN PLANTING ATTACHMENT FOR PLOWS.
No. 371,812. Patented Oct. 18, 1887.
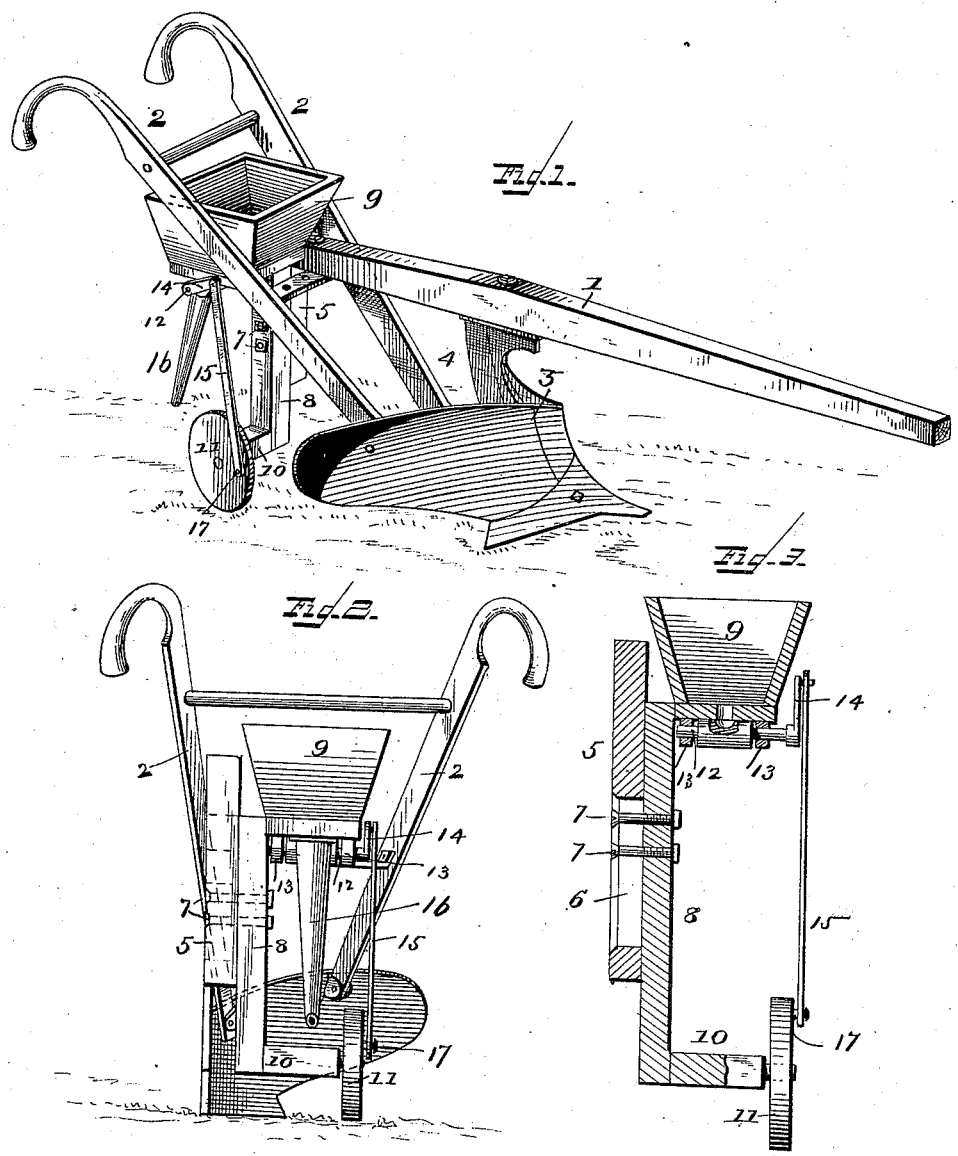
Witnesses
F. L. Ourand
Benj. G. Cowl
Inventor
Frank L. Aten,
By his Attorneys
Louis Bagger & Co.

UNITED STATES PATENT OFFICE.

FRANK L. ATEN, OF ROUND ROCK, TEXAS.

CORN-PLANTING ATTACHMENT FOR PLOWS.

SPECIFICATION forming part of Letters Patent No. 371,812, dated October 18, 1887.

Application filed August 5, 1887. Serial No. 246,188. (No model.)

*To all whom it may concern:*

Be it known that I, FRANK L. ATEN, a citizen of the United States, and a resident of Round Rock, in the county of Williamson and State of Texas, have invented certain new and useful Improvements in Corn-Planting Attachments for Plows; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of a common plow provided with my improved corn-planting attachment. Fig. 2 is a rear view of the same, and Fig. 3 is a transverse vertical sectional view of the attachment.

Similar numerals of reference indicate corresponding parts in all the figures.

My invention has relation to corn-planting attachments for plows; and it consists in the improved construction and combination of parts of such an attachment, which may be secured to the rear end of the beam of a common breaking-plow, having a wheel running in the furrow operating the dropping mechanism, as hereinafter more fully described and claimed.

In the accompanying drawings, the numeral 1 indicates the beam of the plow, which beam may be of the usual construction and be provided with suitable handles, 2, and with the body 3 suitably secured to the standard 4. A standard, 5, is secured to the rear end of the beam, and is formed with a longitudinal slot, 6, in which two screw-bolts, 7, slide adjustably, the said bolts being secured in another standard, 8, the upper end of which has the seed-box 9 secured to it, while the lower end has an arm or stud, 10, projecting laterally. A wheel, 11, is journaled upon the outer end of the stud or arm, and a shaft, 12, operating the seed-dropping mechanism, is journaled transversely to rock in bearings 13 under the bottom of the seed-box, and has an arm or crank, 14, upon its end, to which a connecting-rod, 15, is pivoted with its upper end, the said connecting-rod having its lower end pivoted upon a wrist-pin, 17, upon the face of the driving-wheel. A seed-tube, 16, projects from the bottom of the seed-box, conveying the seed from the box into the furrow opened by the plow.

It will now be seen that when the attachment is secured to the plow-beam and the plow is propelled the wheel will travel in the furrow and revolve, rocking the shaft upon the under side of the seed-box, and thus causing seed to be dropped into the furrow, and when the next furrow is plowed the seed in the former furrow will be covered by the slice turned over, the thickness of the covering-slice being governed by the depth to which the furrow is plowed.

The standard carrying the seed-box and wheel may be raised or lowered and adjusted to different heights by means of the screw-bolts, and the distances between the seeds dropped may be regulated by using a driving-wheel of different diameter, a larger wheel planting at longer distances, and vice versa.

The attachment may be applied to any plow having a place at the rear end of the beam to which the slotted standard may be secured, and any suitable plow body or shovel may be used with the plow.

Having thus described my invention, I claim and desire to secure by Letters Patent of the United States—

1. The combination, with a common breaking-plow or similar plow, of a longitudinally-slotted standard secured to the rear end of the plow-beam, a standard having the seed-box secured to the upper end and having a stud or arm at its lower end, and secured adjustably with bolts in the slot, a drive-wheel journaled upon the end of the arm or stud, a rock-shaft journaled under the bottom of the seed-box and operating the seed-dropping mechanism, and a connecting-rod pivoted to a wrist-pin upon the wheel and to an arm or crank upon the end of the rock-shaft, as and for the purpose shown and set forth.

2. The combination, in a planting attachment for plows, of a standard having a longitudinal slot and adapted to be secured to the beam of a plow, a standard sliding adjustably with bolts in the slot and having a seed-box and a wheel journaled at the lower end, a rock-shaft operating the dropping mechanism in the seed-box, and a connecting-rod pivoted to a crank of the shaft and to a stud upon the wheel, as and for the purpose shown and set forth.

In testimony that I claim the foregoing as my own I have hereunto affixed my signature in presence of two witnesses.

FRANK L. ATEN.

Witnesses:
J. A. FOYIL,
IRA A. ATEN.